Sept. 25, 1962
R. I. HOMIER
3,055,627
MULTIPLE POSITION SEAT TRACK
Filed May 31, 1957
4 Sheets—Sheet 1
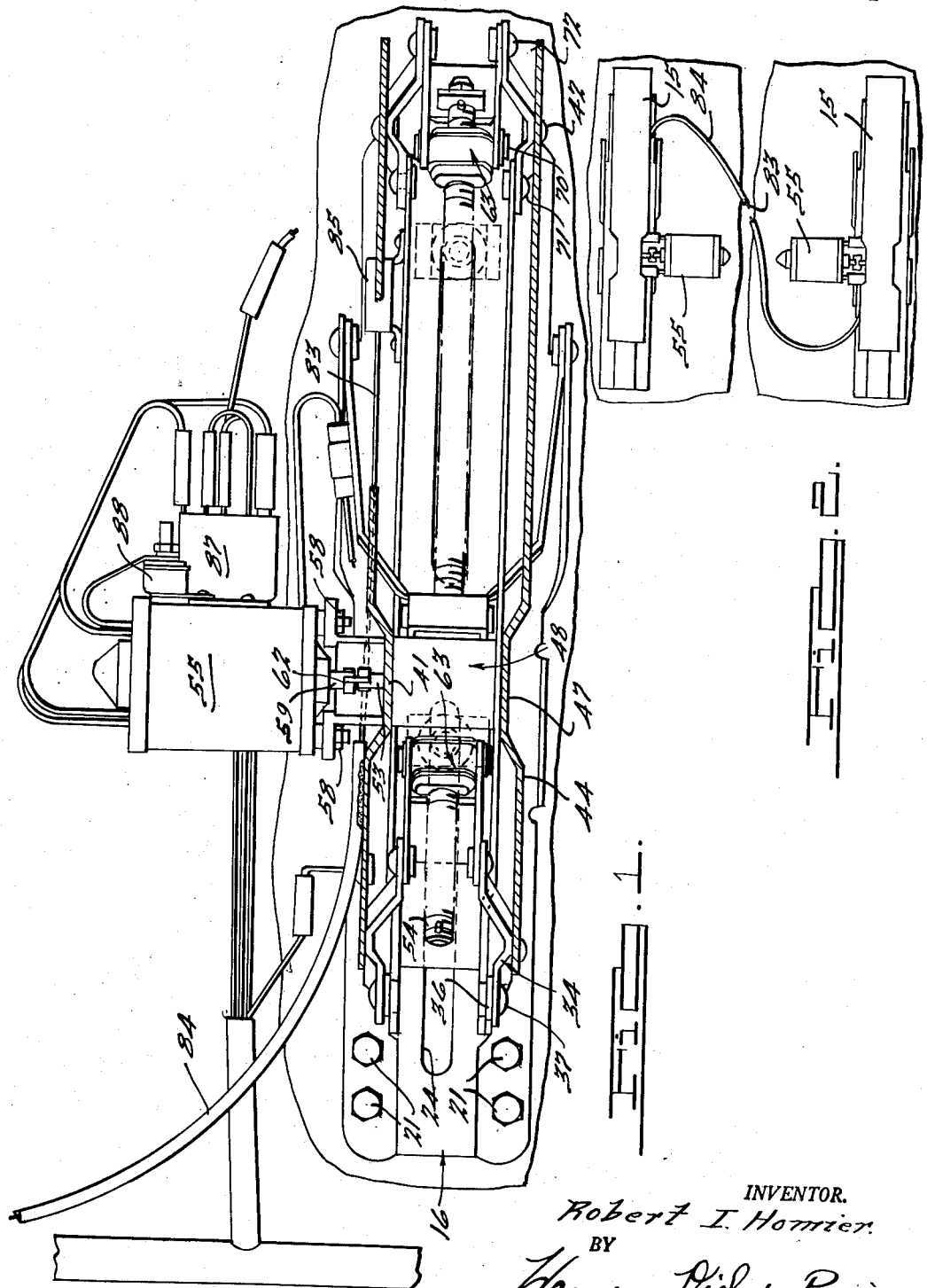
INVENTOR.
Robert I. Homier
BY
Harness, Dickey & Pierce
ATTORNEYS.

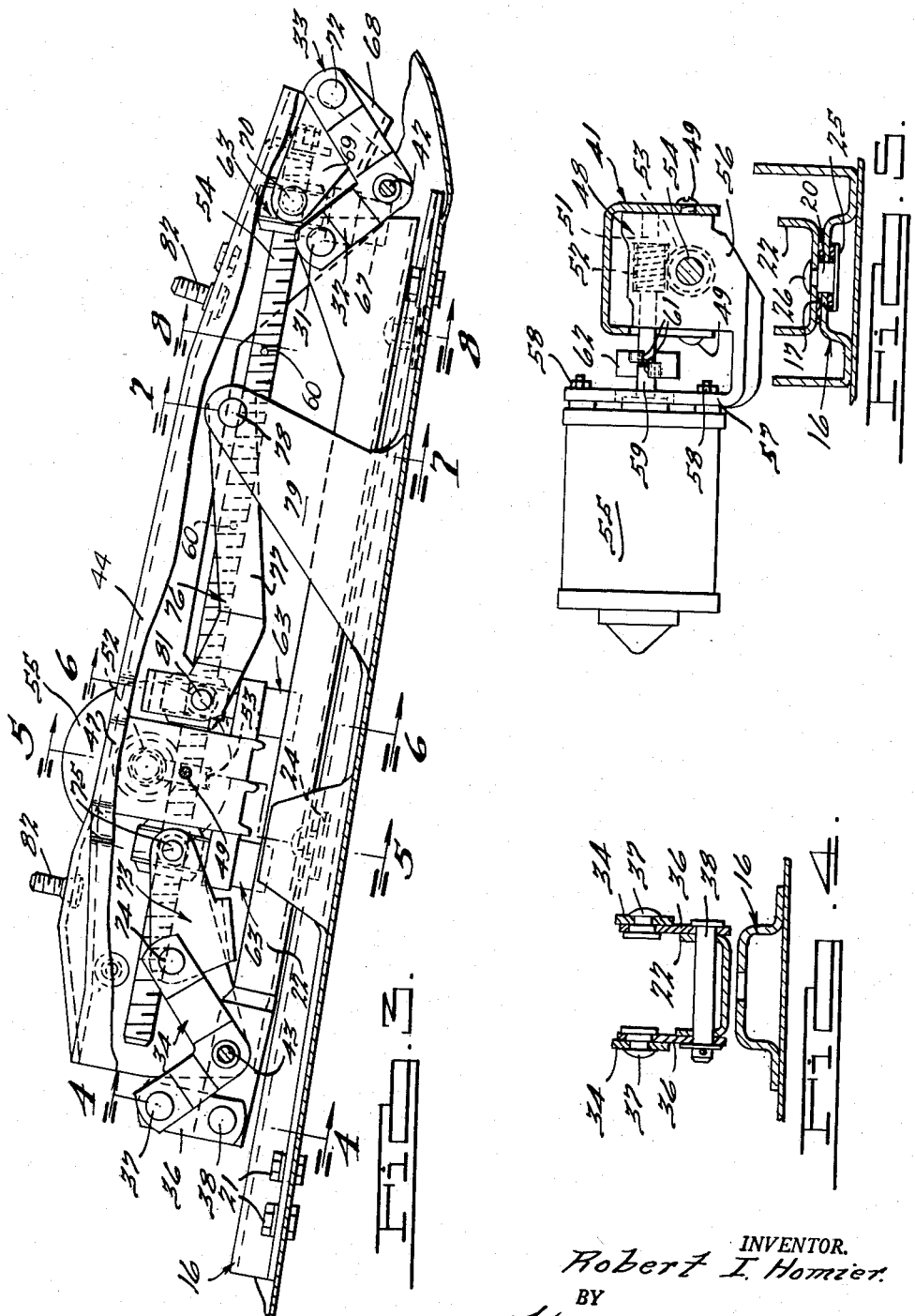

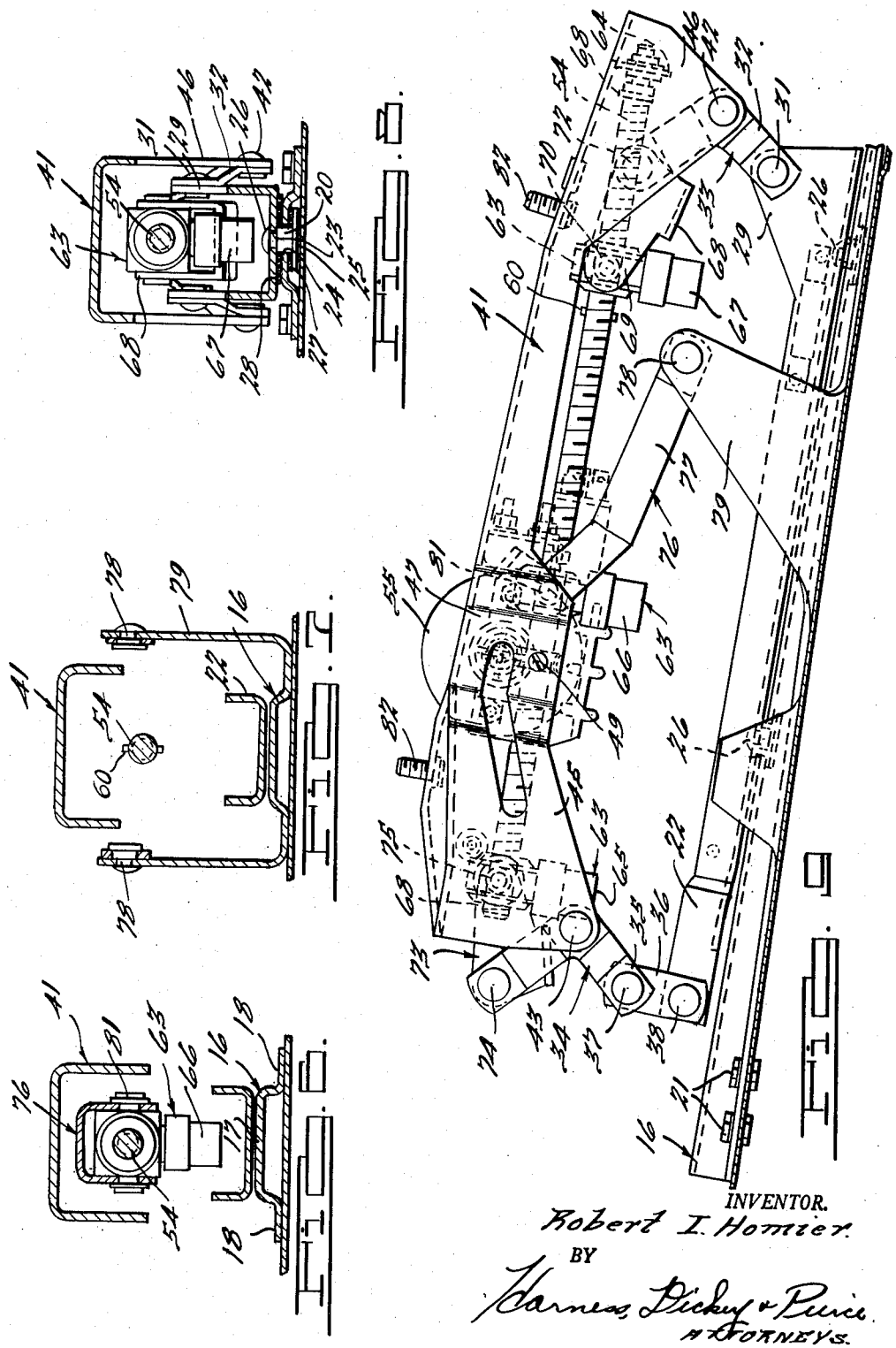

Sept. 25, 1962
R. I. HOMIER
3,055,627
MULTIPLE POSITION SEAT TRACK
Filed May 31, 1957
4 Sheets-Sheet 4
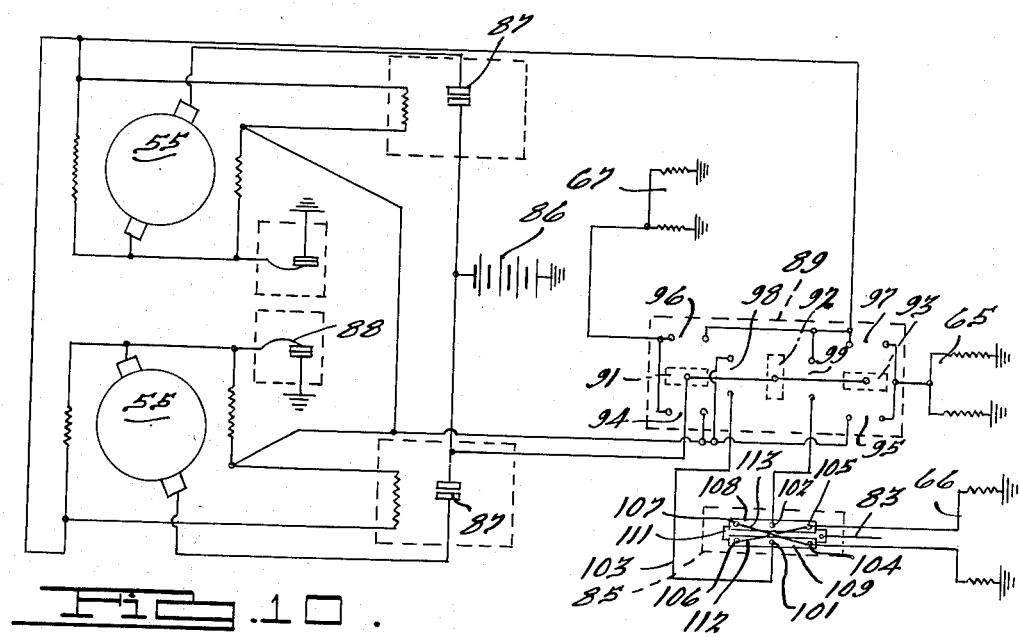
FIG. 10.
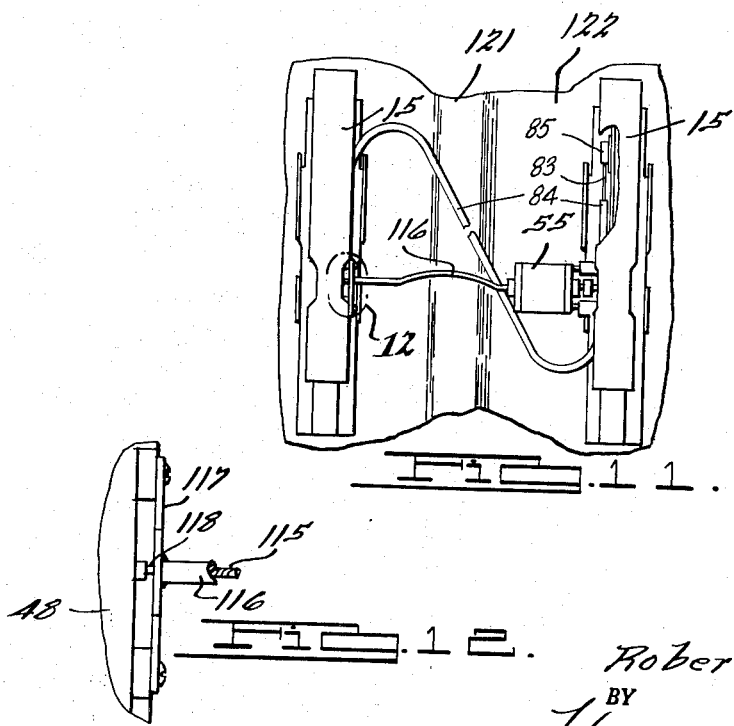
FIG. 11.
FIG. 12.
INVENTOR.
Robert I. Homier.
BY
Harness, Dickey & Pierce.
ATTORNEYS.

United States Patent Office 3,055,627
Patented Sept. 25, 1962

3,055,627
MULTIPLE POSITION SEAT TRACK
Robert I. Homier, Detroit, Mich., assignor to American Metal Products Company, Detroit, Mich., a corporation of Michigan
Filed May 31, 1957, Ser. No. 662,611
11 Claims. (Cl. 248—393)

This invention relates to seat supporting mechanisms, and particularly to a power-operated seat supporting mechanism which raises, lowers and tilts the seat and moves it forwardly and rearwardly.

The seat supporting and operating device of the present invention embodies a pair of mechanisms one for each side of the seat which are constructed alike and on which a motor may be mounted for independent operation of each of the mechanisms. A motor may be mounted on one of the mechanisms connected to a flexible drive member which operates the other mechanism in synchronized relation to the mechanism supporting the motor. Means additionally may be provided when separate motors are employed to make certain that the operation of the mechanisms are in synchronism with each other so that like operations occur at each side of the seat.

Each mechanism embodies a base stamping, a longitudinally extending horizontally adjustable intermediate stamping, and a seat supporting stamping which is carried by the intermediate stamping. It is to be understood that the intermediate stamping may be placed upon the base stamping for horizontal movement relative thereto, as is customary in the art. When the intermediate stamping is the horizontal adjustable stamping, it is secured to the base stamping in a manner to adjust the seat forwardly and rearwardly. A pair of bell cranks is mounted on the opposite ends of the intermediate stamping for raising, lowering and tilting the seat supporting stamping. The lower arm of the bell crank is pivoted to one end of the intermediate stamping, the central portion of the bell crank being pivoted to the seat supporting stamping. The upper arm of the bell crank is connected by a link to a nut on the operating lead screw which is engaged by the will of the operator in driving relation to the thread thereof. The forward end of the seat engaging stamping is connected in the same manner to the center of a bell crank, the upper arm being connected by a link to a nut on the lead screw and the lower arm being connected by a link to the forward end of the intermediate stamping. The link on the forward bell crank permits the operation of either bell crank independently to the other without binding, to thereby cause either the front or rear end of the seat engaging stamping to be raised or lowered relative to the intermediate and base stampings.

A motor is carried by one or both of the seat supporting stampings for rotating the lead screws thereof in a clockwise or counterclockwise direction. A motor may be employed in both of the two mechanisms or on a single mechanism, in which latter case a flexible drive element will extend from the motor to the drive for the lead screw of the other mechanism to cause the lead screws of both mechanisms to be driven simultaneously in the same direction by the single motor. When a motor is employed on each of the mechanisms, a flexible element is provided therebetween which causes circuits to be completed and interrupted to make certain that the mechanisms are being operated in synchronism. If the mechanisms are out of synchronization, they are so controlled as to cause one to catch up with the other and come into synchronized relationship. The mechanisms are so constructed as to be exactly alike to be employed on the right and left-hand side of the seat for supporting and operating the seat to any desired position.

Accordingly, the main objects of the invention are: to provide supporting mechanisms for the sides of a seat which are of like construction; to provide operating mechanisms for a seat which are compact, rugged, and which adjust the seat to forward and rearward positions and to raised and tilted positions at the will of the operator; to operate a pair of like seat supporting mechanisms from a motor on each or from a motor on one which is connected by a flexible drive element to the other mechanism; to provide a synchronizing device for each motor of a pair of like seat supporting mechanisms for the purpose of preventing one side of the seat from being advanced or retracted out of alignment with the other side thereof; and, in general, to provide seat supporting mechanisms by which a seat is adjusted vertically, horizontally, and to a desired raised and tilted position, all of which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a broken plan view of one of the seat supporting and adjusting mechanisms embodying features of the present invention;

FIG. 2 is a reduced plan view of a pair of mechanisms each having its own driving motor and interconnected by a synchronizing device;

FIG. 3 is a view in side elevation of the structure illustrated in FIG. 1;

FIG. 4 is a sectional view of the structure illustrated in FIG. 3, taken on the line 4—4 thereof;

FIG. 5 is a sectional view of the structure illustrated in FIG. 3, taken on the line 5—5 thereof;

FIG. 6 is a sectional view of the structure illustrated in FIG. 3, taken on the line 6—6 thereof;

FIG. 7 is a sectional view of the structure illustrated in FIG. 3, taken on the line 7—7 thereof;

FIG. 8 is a sectional view of the structure illustrated in FIG. 3, taken on the line 8—8 thereof;

FIG. 9 is a view in elevation of the structure illustrated in FIG. 3, when the mechanism was adjusted rearwardly and moved to seat raised and tilted position;

FIG. 10 is a wiring diagram showing the circuit and element therein employed to drive the motors of the seat supporting mechanisms illustrated in the above mentioned figures;

FIG. 11 is a view of structure, similar to that illustrated in FIG. 2, showing a form thereof wherein a single motor is employed to drive both of the mechanisms, and FIG. 12 is an enlarged view of the structure illustrated in FIG. 11, as viewed within the area 12 thereof.

A pair of seat supporting mechanisms 15 is illustrated in FIG. 2 spaced apart on each side of the floor of a vehicle for supporting a seat at the side edges thereof. Each of the mechanisms is exactly the same so that it can be employed on either the right or left-hand side of the seat. Each mechanism comprises three stampings which are preferably of channel shape to provide strength and stability when disposed in longitudinal nested relation to each other. A base stamping 16 has a downwardly presenting channel portion 17 with lateral extending flanges 18 by which the base stamping is secured to the floor 19 of a vehicle body when the mechanisms are employed for supporting a vehicle seat. Bolts 21 or other suitable means are employed for securing the base stampings 16 to the floor.

Spaced apertures 23 in the web of an intermediate channel-shaped stamping 22 are aligned with elongated slots 24 provided in the web of the channel portion 17 of the base stamping 16. Headed rivets 25 extend through the slots 24 and the apertures 23, with the end flanged over to form a head 26 which secures the rivet to the intermediate channel 22. A sleeve 20 is placed over the rivet in engagement with the edges of the slot in rotative relation therewith. Washers 27 and 28 are mounted on the rivets 25 on opposite sides of the web of the channel portion 17. The washers have a face of antifriction material, preferably of low friction Teflon, as disclosed in the copending application of R. G. Heyl, Jr., Serial No. 583,654, filed May 9, 1956, and assigned to the assignee of the present invention. In this manner, the intermediate stamping 22 is firmly secured to the channel 17 of the base stamping 16 for free longitudinal adjustment thereon.

The flanges on the side of the intermediate stamping 22 are lengthened at 29 for the purpose of receiving and supporting rivets 31 on which a lower arm 32 of a pair of bell cranks 33 is pivoted. A pair of bell cranks 34 is mounted at the front end of the intermediate stamping 22, the lower arms 35 of which are secured to links 36 by a rivet 37. The links 36 are connected to the flange of the intermediate stamping 22 by pins 38. In this manner, the bell cranks 34 at one end of the mechanism have a loose connection relative to the end of the intermediate stamping 22 while the bell cranks 33 at the opposite end are directly pivoted thereto. This permits one of the bell cranks to be operated independent of the other for producing the vertical and tilting movement of the seat at one or the other ends of the mechanisms independently of the other and producing the simultaneous vertical movement of the seat when the bell cranks are moved simultaneously. The centers of the bell cranks are pivoted to the seat supporting stamping 41 by rivets 42 and 43. The seat supporting stamping 41 has the side flanges 44 extending downwardly at the front at 45 and at the rear at 46. The flanges in the central forward portion are indented inwardly at 47 between the flanges 44. The speed reducing element 48 is supported on indented flanges 47 by a pair of screws 49, and comprises a shaft 51 having a worm 52 thereon which mates with a worm wheel 53. The worm wheel drives a lead screw 54 in a clockwise or counterclockwise direction from a motor 55 mounted on a housing 56. The speed reducing unit 48 has an outwardly and upwardly directed portion 57 which forms an outboard support for the motor 55. The motor is attached by a plurality of screws and nuts 58 to the outer face of the upper projecting portion of the outboard support 57. In this manner, the motor and the speed reducing unit are movable upwardly and downwardly with the seat supporting stamping 41.

The shaft 59 of the motor and the shaft 51 of the speed reducing unit have slots on the end which receive right angle disposed flange sections 61 of a stamp connector 62 to couple the shafts in driving relation. Nut mechanisms 63 are provided on the lead screw 54, the rear end of which is mounted on a downwardly extending flange 64 of the seat supporting stamping 41 for rotation relative thereto. The nut mechanisms 63 and the solenoid and braking mechanism provided thereon are described and claimed in detail in the copending application of R. J. Williams et al. Serial No. 481,562, filed January 13, 1955, now U.S. Patent 2,857,776 granted October 28, 1958, and assigned to the assignee of the present invention. When the solenoid of a nut mechanism is energized, the brake mechanism prevents the nut from rotating and produces the driving engagement of the nuts on the lead screw which move therealong forwardly or rearwardly depending upon the direction of rotation of the motor 55. Three such mechanisms are illustrated on the lead screw 54, one indicated by the numeral 65 located forwardly of the motor 55, one indicated by the numeral 66 next adjacent to the motor 55 but rearwardly thereof, and one indicated by the numeral 67 at the rear portion of the lead screw. Each side of the nut, stop pins 60 are provided on lead screw 54 for limiting the longitudinal movement of nuts on the lead screw, the pins releasing the brake mechanism so that the nuts are free to rotate and will no longer be driven by the screw as described and illustrated in the above mentioned copending application.

A U-shaped link 68 has spaced flange portions 69, the forward end of which is secured by shouldered screws 70 to the nut mechanism 67, the rearward ends of the flange portions 69 being pivoted by rivets 72 to the upper end of the bell crank 33. A similar U-shaped link 73 is pivoted to the upper arm of the bell crank 34 by rivets 74, the opposite flanges of the link being pivoted by shouldered screws 75 to the nut mechanism 65. The nut mechanisms 65 and 67 may be energized simultaneously to produce the simultaneous upward or downward movement of both ends of the seat supporting stamping 41 or the nut mechanisms may be independently operated to raise or lower the forward or rearward ends of the stamping 41, thereby tilting the seat to a desired position while elevating or lowering the forward or rear edge of the seat.

A U-shaped bracket 76 has two extending arms 77 thereof pivoted by rivets 78 to upwardly projecting flange portions 79 of the base stamping 16. The opposite ends of the arms are pivoted to the nut mechanism by inwardly extending shouldered screws 81. When the solenoid of the nut mechanism 66 is energized, the nut is held in driving relation with the lead screw 54 to produce the forward and rearward movement of the intermediate stamping 22 on the base stamping 16 carrying the seat, the motor, the seat supporting stamping 41, bell cranks and lead screw and nut mechanisms along therewith. The screws 82, projecting upwardly from the stamping 41, secure the frame of the seat to the stampings 41. Thus, by operating a switch button on the seat, the motors 55 are operated in either direction of rotation while the solenoid of the nut mechanism 66 is energized to produce the forward or rearward movement of the seat. Similarly, by operating a button of a switch, the motors are driven in either direction of rotation and the solenoids of the nut mechanisms 65 and 67 energized simultaneously to raise or lower the seat vertically or independently to raise or lower the forward or rearward edge of the seat to tilt it to a desired position.

As illustrated in FIG. 1, a motor 55 is provided on both of the seat mechanisms and no assurance is had that the motors will always operate simultaneously or at exact speed so that the mechanisms may move out of alignment when adjusting the seat forwardly or rearwardly, which racks the seat frame causing possible fracture in the mechanism or frame. To offset such a possibility, interconnection is provided between the two horizontally movable channel-shaped stampings 22, which repositions one of the stampings should the stampings move out of synchronism with each other.

Referring to FIGS. 1 and 2, a stiff operating wire 83 which slides within a casing 84 has one end rigidly attached to the stamping 22 of one of the mechanisms 15 and formed in S shape between the two mechanisms 15, as illustrated in FIG. 2. One or both of the ends of the casing 84 are welded or otherwise secured to the stamping 22 of the mechanism. The other end of the wire 83 is attached to a switch 85 which is mounted on the stamping 22 of the other mechanism 15. Thus, one end of the wire moves with the stamping 22 of one mechanism while the other end of the wire, carried by the stamping 22 of the other mechanism, moves relative to the switch 85 and operates the switch should the elements 22 move out of aligned relation with each other. The end of the wire 83 does not shift and the switch is not operated so long as both of the stampings 22 move in synchronism. However, when one of the stampings attempts to move ahead of or lags behind the other, the difference in position between the stampings 22 causes the end of the wire adjacent to the switch to move relative to the switch either forwardly or rearwardly thereof, thereby operating the switch to either of the forward or rearward positions. When the switch is operated, the nut controlling the movement of the stamping 22 which has advanced ahead of the other is released from the lead screw to permit the other stamping to catch up therewith, whereupon the switch 85 is returned to its neutral position to have both of the stampings driven in aligned relation.

This control is better illustrated in the wiring diagram of FIG. 10 wherein the motors 55 are energized from a battery 86 through relays 87 and a protective relay 88, the relay and battery completing the circuit through ground. The switch control mechanism is illustrated by a dotted line 89 which confines three switch bridging bars 91, 92 and 93 located adjacent to the driver of the vehicle. The bars 91 and 93, when moved to bridge the contacts 94 and 95, respectively, will operate the mechanism to simultaneously raise both the front and rear ends of the seat. Should either one of the bars 91 or 93 be separately energized, then either the forward or rearward end of the seat will be raised to tilt the seat to the other end. Simultaneously with the operation of the movement of the bars 91 and 93, the motors 55 are energized in either direction of rotation. When the bars 91 and 93 are moved to the opposite direction, then the contacts 96 and 97 are bridged to produce the lowering of the seat simultaneously or separately if the switch bars 91 and 93 are moved separately to tilt either the forward or rearward portion of the seat by the lowering movement. The central bar 92 is operated to the left to bridge the contacts 98 or to the right to bridge the contacts 99 to move the seat forwardly and rearwardly.

The switch 85 has a pair of central contacts 101 and 102 connected in a circuit 103. The switch also has a pair of contacts 104 and 105 disposed to the right of the central contacts and a pair of contacts 106 and 107 disposed to the left of the central contacts. A bridging bar 108 interconnects the contacts 102, 105 and 107, while a bridging bar 109 interconnects the contacts 101, 104 and 106. These two bars are connected together by an insulating member 111, one end of which is connected to the end of the wire 83. A conductor 112 interconnects the contacts 105 and 106, while a conductor 113 interconnects the contacts 104 and 107. When the bar 92 bridges either the contacts 98 or 99, the seat will be moved forwardly or rearwardly, depending upon the direction of rotation of the motor when the solenoids 66 are energized to lock the associated nuts to the lead screws. Should one of the stampings 22 move ahead of or lag behind the other, the relative movement of the end of the control wire 83 will produce a pull or push movement on the insulating member 111, to thereby shift the two bars 108 and 109 either to the left or right to disconnect the pair of contacts 104 and 105 or the pair of contacts 106 and 107 from the central contacts 101 and 102. When the movement of the control wire 83 is to the left, contacts 104 and 105 are de-energized so that energy from the battery through the circuit 103 to the contact 101 passes through the bar 109 to the contact 106, then through the conductor 112 to the contact 105 to energize the top solenoid 65, thereby de-energizing the lower solenoid 66, as illustrated in FIG. 10. Such de-energization releases the nut on the lead screw of the mechanism 15 which had the stamping 22 moved ahead to permit the opposite stamping to move forwardly to catch up with the stamping which is no longer moved. This causes the end of the wire 83 to move back to neutral position to thereby shift the insulating member 111 and the bridging bars 108 and 109 to initial position, as illustrated in the figure. Should the opposite member move ahead from the one just described, the wire 83 will pull the insulating member 111 and the bridging members 108 and 109 to the right, to thereby interrupt the circuit to the contacts 106 and 107 which, following the description above, will maintain the solenoid actuated nut 66 on one mechanism energized while the solenoid actuated nut 66 on the other mechanism will become de-energized and thereby permit the stampings 22 of the one mechanism to move into alignment with that of the other mechanism as the end of the wire 83 shifts the conducting bars 108 and 109 back to neutral.

This synchronization control was described for the forward movement of the seat, and it is to be understood that the same control between the two stampings 22 of the mechanisms occurs upon the movement of the seat to the rear. The problem of racking the seat in the present arrangement was present in the forward and rearward movement of the mechanism but not so much in the vertical movement thereof. It is to be understood, however, that a similar control as described relative to the horizontal movement can be applied to the vertical movement if this is found desirable.

Referring to FIGS. 11 and 12, a further form of the invention is illustrated, that wherein the motor 55 is employed to drive both of the mechanisms 15 directly through a flexible encased drive shaft 115 disposed within a protective housing 116. The end of the housing 116 is secured to a plate 117 which bridges the reduction gear box 48 with the end of the flexible driving element 115 secured to the shaft 118 extending therefrom. The plate 117 is fastened to the gear box in the same manner as the motor was fastened thereto. When the motor 55 is operated, it will drive the lead screw at the same speed on either of the mechanisms 15 at all times and the synchronization of the two stampings 22 is practically assured. It is possible, however, due to defective operation of the solenoid actuated nuts, that one may delay its engagement or fail to operate and one of the stampings 22 may move out of alignment with the other. Should this occur when the synchronizing mechanism illustrated in FIG. 2 is employed, as illustrated in FIG. 11, the relative movement between the stampings 22 will cause the switch 85 to be operated and the moving nut disconnected from its lead screw. This interrupts the seat movement and prevents any undue racking and strain on any of the mechanism parts.

In the construction of the present invention, there are no heavy members interconnecting the two mechanisms 15 beneath the seat and only the control wire 83 or the flexible driving element 15, or both, are employed between the two mechanisms. This seat supporting structure requires very little clearance over the tunnel 121 disposed longitudinally in the central part of the floor 122 of the vehicle body.

What is claimed is:

1. In a seat supporting device having a pair of adjustable mechanisms located in spaced relation to each other beneath the seat, each mechanism having a base member and seat supporting means adjustable relative to said base member horizontally and vertically, means on each mechanism for independently adjusting said supporting means forwardly and rearwardly, means on each mechanism for independently raising and lowering said supporting means, an operating means interconnecting said mechanisms for retaining them in aligned relation across the seat, and means actuated by said operating means for interrupting the movement of the seat supporting means of one mechanism until the other mechanism comes into alignment should misalignment occur.

2. In a seat supporting device having a pair of adjustable mechanisms located in spaced relation to each other beneath the seat, each mechanism having a base member and seat supporting means adjustable relative to said base member horizontally and vertically, means on each mechanism for independently adjusting said supporting means forwardly and rearwardly, means on each mechanism for independently raising and lowering said supporting means, an operating means interconnecting said mechanisms for retaining them in aligned relation across the seat, means actuated by said operating means for interrupting the movement of the seat supporting means of one mechanism until the other mechanism comes into alignment should misalignment occur, said interconnecting means being a wire, and a switch on one of said means of one mechanism to which one end of said wire is secured, the other end of the wire being secured to the means of the other mechanism whereby the wire end at the switch shifts to operate the switch when one means of one mechanism moves out of alignment with that of the other mechanism.

3. In a seat supporting device having a pair of adjustable mechanisms located in spaced relation to each other beneath the seat, each mechanism having a base member and seat supporting means adjustable relative to said base member horizontally and vertically, means on each mechanism for independently adjusting said supporting means forwardly and rearwardly, means on each mechanism for independently raising and lowering said supporting means, an operating means interconnecting said mechanisms for retaining them in aligned relation across the seat, means actuated by said operating means for interrupting the movement of the seat supporting means of one mechanism until the other mechanism comes into alignment should misalignment occur, said interconnecting means being a wire, and a switch on one of said means of one mechanism to which one end of said wire is secured, the other end of the wire being secured to the means of the other mechanism whereby the wire end at the switch shifts to operate the switch when one means of one mechanism moves out of alignment with that of the other mechanism, the ends of said operating wire presenting in opposite directions.

4. In a seat supporting device having a pair of adjustable mechanisms located in spaced relation to each other beneath the seat, each mechanism having a base member and seat supporting means adjustable relative to said base member horizontally and vertically, means on each mechanism for independently adjusting said supporting means forwardly and rearwardly, means on each mechanism for independently raising and lowering said supporting means, an operating means interconnecting said mechanisms for retaining them in aligned relation across the seat, means actuated by said operating means for interrupting the movement of the seat supporting means of one mechanism until the other mechanism comes into alignment should misalignment occur, said interconnecting means being a wire, and a switch on one of said means of one mechanism to which one end of said wire is secured, the other end of the wire being secured to the means of the other mechanism whereby the wire end at the switch shifts to operate the switch when one means of one mechanism moves out of alignment with that of the other mechanism, the operating wire being disposed in S-shape between the two mechanisms to have the ends presenting in opposite directions.

5. In a seat supporting device having a pair of like adjustable mechanisms located in spaced relation to each other beneath the seat, each mechanism having a base member, seat supporting means, a horizontally shiftable means in combination with vertically adjustable means at each end of the seat supporting means, drive means for the horizontal shiftable means and for the raising and lowering means which are operated selectively or simultaneously, motor means on each of said mechanisms for operating the drive means thereof, and means for maintaining the adjustment of the seat supporting means aligned in both of the mechanisms, said aligning means embodying an operating wire interconnecting the shiftable means of said mechanisms with the ends of the wires presenting in opposite directions.

6. In a seat supporting device having a pair of like adjustable mechanisms located in spaced relation to each other beneath the seat, each mechanism having a base member, seat supporting means, a horizontally shiftable means in combination with vertically adjustable means at each end of the seat supporting means, drive means for the horizontal shiftable means and for the raising and lowering means which are operated selectively or simultaneously, motor means on each of said mechanisms for operating the drive means thereof, and means for maintaining the adjustment of the seat supporting means aligned in both of the mechanisms, said aligning means embodying an operating wire interconnecting the shiftable means of said mechanisms with the ends of the wires presenting in opposite directions produced by disposing said operating wire in S-shape between the mechanisms.

7. In a seat supporting device having a pair of like adjustable mechanisms located in spaced relation to each other beneath the seat, each mechanism having a base member, seat supporting means, a horizontally shiftable means in combination with vertically adjustable means at each end of the seat supporting means, drive means for the horizontally shiftable means and for the raising and lowering means which are operated selectively or simultaneously, motor means on each of said mechanisms for operating the drive means thereof, means for maintaining the adjustment of the seat supporting means aligned in both of the mechanisms, said aligning means embodying an operating wire interconnecting the shiftable means of said mechanisms with the ends of the wires presenting in opposite directions, one end of the wire being secured to the shiftable means of one mechanism, and a switch on the shiftable means of the other mechanism having a movable element thereon to which the other end of the wire is secured.

8. In a seat supporting device having a pair of like adjustable mechanisms located in spaced relation to each other beneath the seat, each mechanism having a base member, seat supporting means, a horizontally shiftable means in combination with vertically adjustable means at each end of the seat supporting means, drive means for the horizontally shiftable means and for the raising and lowering means which are operated selectively or simultaneously, a motor for driving the operating device of one mechanism, flexible drive means from said motor extending to the drive means of the other mechanism whereby both drive means are operated in synchronism when the one motor is energized, and means interconnecting the shiftable means of both of the mechanisms to maintain them aligned when adjusted.

9. In a seat supporting device having a pair of like adjustable mechanisms located in spaced relation to each other beneath the seat, each mechanism having a base member, seat supporting means, a horizontally shiftable means in combination with vertically adjustable means at each end of the seat supporting means, drive means for the horizontally shiftable means and for the raising and lowering means which are operated selectively or simultaneously, a motor for driving the operating device of one mechanism, flexible drive means from said motor extending to the drive means of the other mechanism whereby both drive means are operated in synchronism when the one motor is energized, and means interconnecting the shiftable means of both of the mechanisms to maintain them aligned when adjusted, said means embodying an operating wire disposed in S shape between the two mechanisms with the ends presenting in the opposite direction.

10. In a seat supporting device having a pair of like adjustable mechanisms located in spaced relation to each other beneath the seat, each mechanism having a base member, seat supporting means, a horizontally shiftable means in combination with vertically adjustable means at each end of the seat supporting means, drive means for the horizontally shiftable means and for the raising and lowering means which are operated selectively or simultaneously, a motor for driving the operating device of one mechanism, flexible drive means from said motor extending to the drive means of the other mechanism whereby both drive means are operated in synchronism when the one motor is energized, means interconnecting the shiftable means of both of the mechanisms to maintain them aligned when adjusted, said means embodying an operating wire disposed in S shape between the two mechanisms with the ends presenting in the opposite direction, one end of the wire being secured to the shiftable means of one mechanism, and a switch on the shiftable means of the other mechanism having a movable element to which one end of the wire is secured whereby when one shiftable means moves out of alignment with the other the switch will be operated in one or the other direction to cause the shiftable means to come into alignment.

11. In a seat supporting device for a vehicle having a tunnel, said device having a pair of like adjustable mechanisms located in spaced relation to each other beneath the seat, each mechanism having a base member, seat supporting means, a horizontally shiftable means in combination with vertically adjustable means at each end of the seat supporting means, drive means for the horizontally shiftable means and for the vertically adjustable means which are operated selectively or simultaneously, a motor carried by one of said mechanisms for driving the operating device of said mechanism, and flexible drive means from said motor extending across the central portion of the seat therebeneath and secured to the drive means of the other mechanism whereby both drive means are operated in synchronism when the one motor is energized without interference with the tunnel of the vehicle.

References Cited in the file of this patent

UNITED STATES PATENTS

| | | |
|---|---|---|
| 1,664,129 | Pallenberg | Mar. 27, 1928 |
| 2,360,805 | Thoma | Oct. 17, 1944 |
| 2,483,653 | Lustig | Oct. 4, 1949 |
| 2,609,029 | Haberstump | Sept. 2, 1952 |
| 2,765,024 | Brundage | Oct. 2, 1956 |
| 2,784,764 | Rigby et al. | Mar. 12, 1957 |
| 2,809,688 | Brundage | Oct. 15, 1957 |
| 2,809,689 | Garvey | Oct. 15, 1957 |

FOREIGN PATENTS

| | | |
|---|---|---|
| 1,123,195 | France | June 4, 1956 |